April 21, 1959 B. L. POLINAK 2,883,242
TRACK SHOE ASSEMBLY
Filed July 28, 1958 2 Sheets-Sheet 1

INVENTOR.
Bernard L. Polinak
BY
R. F. Barnard
ATTORNEY

April 21, 1959  B. L. POLINAK  2,883,242
TRACK SHOE ASSEMBLY
Filed July 28, 1958  2 Sheets-Sheet 2
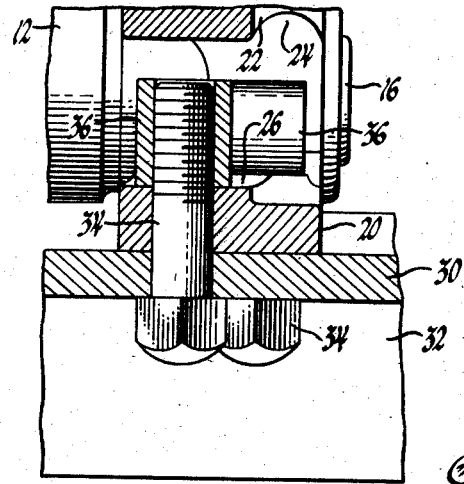
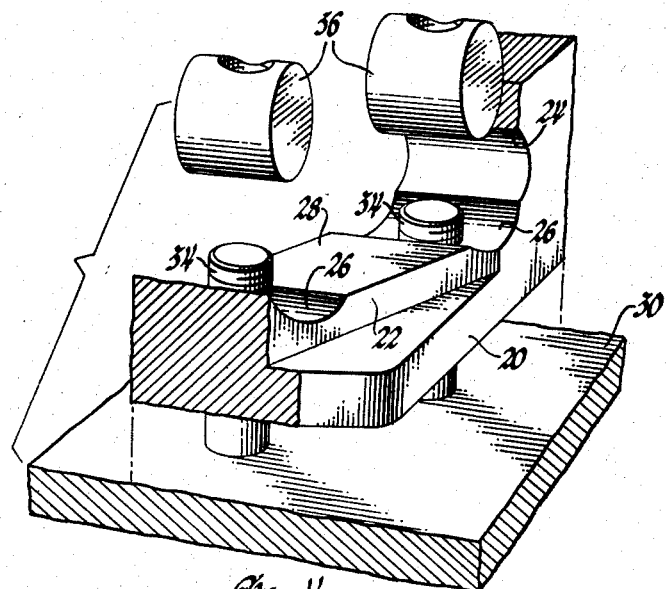
INVENTOR.
Bernard L. Polinak
BY
R. F. Bernard
ATTORNEY

United States Patent Office 2,883,242
Patented Apr. 21, 1959

2,883,242

TRACK SHOE ASSEMBLY

Bernard L. Polinak, Cleveland, Ohio, assignor to General Motors Corporation, Detroit, Mich., a corporation of Delaware Application July 28, 1958, Serial No. 751,439

6 Claims. (Cl. 305—10)

This invention relates to a track shoe assembly for crawler tractors and the like and, particularly, to such an assembly comprising track shoes secured to track links in a manner to relieve stress concentrations in the latter thereby reducing the probability of track failure.

Endless tracks of the type normally employed with crawler tractors include a plurality of pairs of laterally spaced track links articulably connected in end to end relationship. Track shoes are bolted laterally to each pair of track links, and are provided with depending grousers for providing traction in propelling the tractor across the ground. In forming such an endless track, it has been the conventional practice heretofore to form a pair of longitudinally spaced openings in the web of each link in which locking nuts have been placed to threadably receive the ends of bolts extending through the track shoe to bolt the latter laterally to each pair of track links to form a track shoe assembly. Primarily in the interest of facilitating the assembly procedure, each opening in each track has been provided with a machined recess of rectangular or other polygonal cross section corresponding to the shape of the nut to be employed in which the latter could be self-positioned and non-rotatively retained so that the tightening of the bolt could be accomplished without the need of a holding wrench or other tool on the nut itself.

However, in these prior structures, the sharp corners which occurred in the link structures in defining the recesses for receiving the nuts resulted in the creation of stress concentrations which weakened the track. Such stresses increase the probability of track breakage inasmuch as such track shoe assemblies are subjected to extremely severe treatment in all types of climates. Additionally, from time to time it is desirable to clean such a track of packed mud, frozen snow and ice and the like to maintain its effectiveness in operation. It has been somewhat difficult to clean tracks having conventional track shoe assemblies due to the small size of the web openings which prevent completely free access to the track structure.

Accordingly, it is a principal object and feature of this invention to provide a track shoe assembly in which objectionable stress concentrations are avoided.

Moreover, it is another object and feature of this invention to provide a track shoe assembly comprising track links having elongate openings through the webs thereof defining curved bearing surfaces in each of which a lock nut having a curved bearing surface is self-positioned and non-rotatively seated.

It is yet another object and feature of this invention to provide a track shoe assembly as aforementioned which facilitates cleaning the track due to the relatively large web openings in each track link.

These and other objects of this invention will become more apparent hereinafter as the description of the invention proceeds, and in which reference is made to the following drawings in which:

Figure 3 is a fragmentary sectional view taken on line 3—3 of Figure 2; and

Figure 4 is a fragmentary perspective exploded view showing the track shoe assembly.

Figure 1:
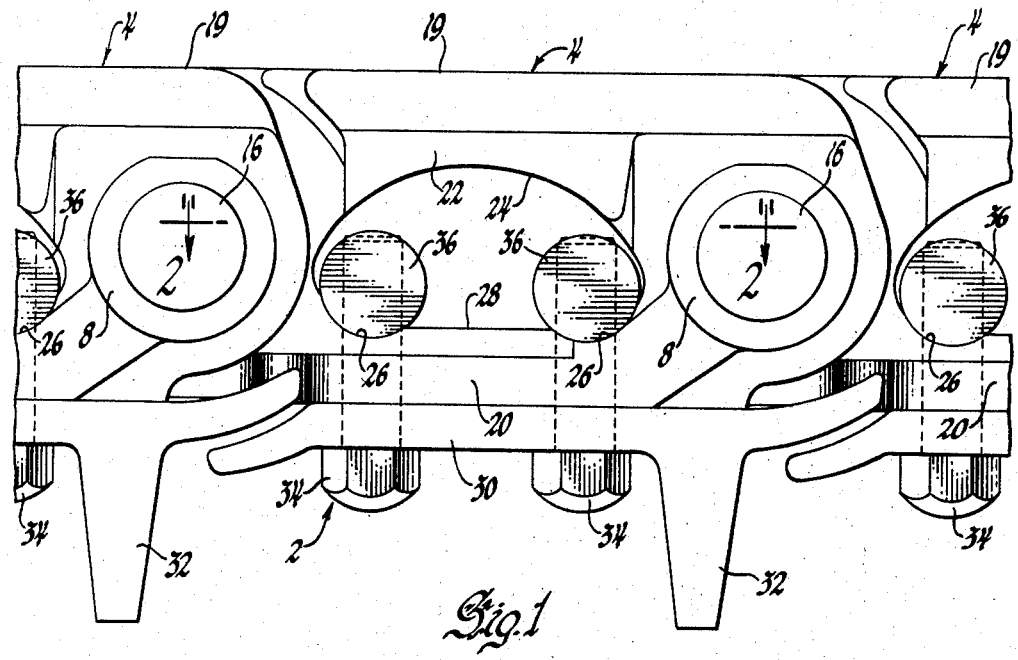
Figure 1 is a fragmentary side elevation of a portion of an endless tractor for crawler tractors employing the track shoe assembly of this invention.
Figure 2:
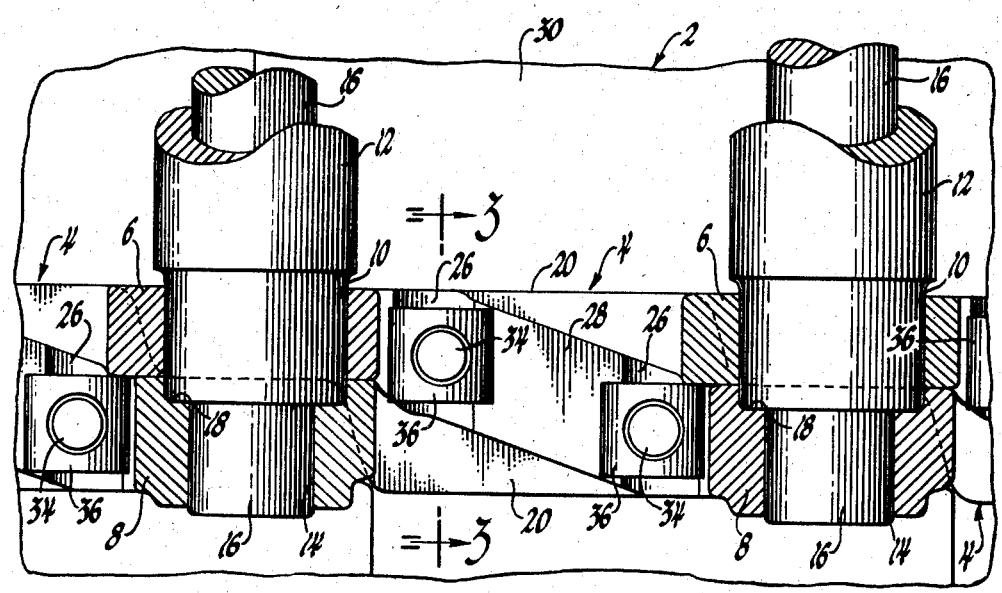
Figure 2 is a section taken on line 2—2 of Figure 1.

Referring now to the drawings, an endless articulated track of the type usually employed with crawler tractors is indicated generally at 2, and includes a plurality of pairs of laterally fixedly spaced track links articulably interconnected in end to end relationship and adapted to be entrained about a driving sprocket wheel and idler wheel of a crawler tractor. The numeral 4 indicates one link of each of the aforementioned pairs of laterally spaced track links, it being understood that the other link of each pair is essentially a mirror image of each of these links which are substantially identical to each other as is well known in the art. Each link 4 includes laterally offset end portions 6 and 8 each of which is adapted to matingly engage the opposite end of an adjacent link. The end 6 of each link is provided with an opening 10 in which the bushing 12 is adapted to be driven with a press-fit. Similarly, the end 8 of each of these links is provided with an opening 14 which is smaller than and aligned with the opening 10 in a mating link end 6. Each opening 14 is adapted to receive with a press-fit a link pin 16 which extends through the bushing 12. The end with the bushing 12 projects laterally outwardly beyond the end 6 of each link and into an annular recess 18 formed in the side wall of each link end 8 so as to surround the opening 14.

In assembling the links of such an endless track, the ends 6 of each link are driven onto the exterior surface of the bushings 12 so as to be secured thereto by a press-fit, while the ends 8 of each link are driven onto the ends of the pins 16 so as to be secured thereto by a press-fit. There is a small clearance between the pin and bushing. As a result, an endless belt or chain is provided which consists of a plurality of pairs of laterally spaced track links articulably connected together.

Each pair of laterally spaced track links is adapted to be provided with a track shoe to form a track shoe assembly. To this end, each link 4 includes an inner wall or edge 19 which travels about the tractor drive sprocket and idler wheels, and an outer wall or edge 20 joined to the inner wall by an intermediate web 22. The web 22 of each link has an opening therethrough defined by a gently arcuately curved inner wall 24 merging at its ends with longitudinally spaced parti-cylindrical bearing seats 26 which are machined as by broaching from a substantially horizontal outer wall 28.

A track shoe which is adapted to be bolted laterally between each pair of links includes a base plate 30 from which there depends a laterally extending grouser 32 to provide traction for a vehicle equipped with the endless track. In order to securely bolt and clamp the plate 30 of each track shoe between its associated pair of track links, a threaded bolt 34 is passed upwardly through the plate 30 and the outer wall or edge 20 of each track link so as to project through each bearing seat 26 into the opening in the web of the track links. A cylindrical internally threaded nut 36 is self-positioned and non-rotatively maintained within each of the seats 26 so as to receive the threaded shank of each of the bolts 34.

Thus, in assembling the track shoe structure, it may be seen that first the cylindrical nuts will be positioned within their respective seats, and then the track shoes bolted onto the laterally spaced links without requiring the use of a wrench or other tool to hold the cylindrical nuts stationary during the bolting operation.

Due to the gentle curvature of the respective bearing seats 26, there is no sharp change in the cross section of the web in providing a seat to non-rotatively position the locking nuts. Accordingly, the inherent stress concentrations resulting from previous conventional structures as aforedescribed are substantially, if not totally, eliminated. Additionally, the single relatively large web opening facilitates cleaning of the track of packed mud, snow, ice and the like which is periodically necessary.

Having shown and described a preferred embodiment of this invention, it is to be understood to be illustrative only and in no way is intended to limit the scope of the invention which is defined by the claims which follow.

I claim:

1. A track shoe assembly comprising a pair of laterally spaced track links, each of said links having a web shaped to form an arcuate bearing seat, a track shoe extending laterally between said links, means for securing said shoe to said links, said means including a bolt extending through said shoe and seat, and a nut having an arcuate bearing surface disposed in said seat and threadably receiving said bolt.

2. A track shoe assembly comprising a pair of laterally spaced track links, each of said links including a web having an elongate opening therethrough, said web of each of said links being shaped to form a parti-cylindrical bearing seat in the outer portion of said opening, a track shoe extending laterally between the outer edges of said links, means for securing said shoe to said links, said means including a bolt extending through said shoe and seat and into the openings in said links, and a nut having a parti-cylindrical bearing surface contiguously disposed in said arcuate seat and threadably receiving said bolt.

3. A track shoe assembly comprising a pair of laterally spaced track links, each of said links having a web shaped to form a parti-cylindrical bearing seat extending transversely of the link, a track shoe extending laterally between said links, means for securing said shoe to said links, said means including a bolt extending through said shoe and seat, and a nut having a parti-cylindrical bearing surface contiguously disposed in said arcuate seat and threadably receiving said bolt.

4. A track shoe assembly comprising a pair of laterally spaced track links, each of said links having a web shaped to form a curved bearing seat, a track shoe extending laterally between said links, means for securing said shoe to said links, said means including a bolt extending through said shoe and seat, and a nut having a curved bearing surface non-rotatively contiguously disposed in said seat and threadably receiving said bolt.

5. A track shoe assembly comprising a pair of laterally spaced track links, each of said links having a web shaped to form a parti-cylindrical bearing seat, a track shoe extending laterally between the lower edges of said links, means for securing said shoe to said links, said means including a bolt extending through said shoe and seat, and a nut having a parti-cylindrical bearing surface non-rotatively contiguously disposed in said seat and threadably receiving said bolt.

6. A track shoe assembly comprising a pair of laterally spaced track links, each of said links having an inner and outer edge joined by an intermediate longitudinally extending web, each of said webs having an opening therethrough and a curved bearing seat at each end of said opening, a track shoe extending laterally between the outer edges of said links, means for securing said shoe to said links, said means including bolts extending through said shoe and seats into the openings in the web of said links, and nuts having a curved bearing surface non-rotatively contiguously disposed in said seats and threadably receiving said bolts.

References Cited in the file of this patent

UNITED STATES PATENTS

| 1,314,649 | Holt | Sept. 2, 1919 |
| 2,719,063 | Dearlove | Sept. 27, 1955 |
| 2,823,080 | Bauer | Feb. 11, 1958 |

FOREIGN PATENTS

| 543,941 | Great Britain | Mar. 20, 1942 |
| 515,265 | Belgium | Oct. 29, 1952 |

UNITED STATES PATENT OFFICE

CERTIFICATE OF CORRECTION

Patent No. 2,883,242                                              April 21, 1959

Bernard L. Polinak

It is hereby certified that error appears in the printed specification of the above numbered patent requiring correction and that the said Letters Patent should read as corrected below.

Column 2, line 1, for "endless tractor" read -- endless track --; line 29, for "end with the bushing" read -- end of the bushing --.

Signed and sealed this 8th day of December 1959.

(SEAL)
Attest:

KARL H. AXLINE                                            ROBERT C. WATSON
Attesting Officer                                         Commissioner of Patents